July 18, 1933.   F. M. McCLENAHAN   1,918,923
METHOD OF RECOVERING ALUMINA FROM SILICATES
Filed Oct. 31, 1929
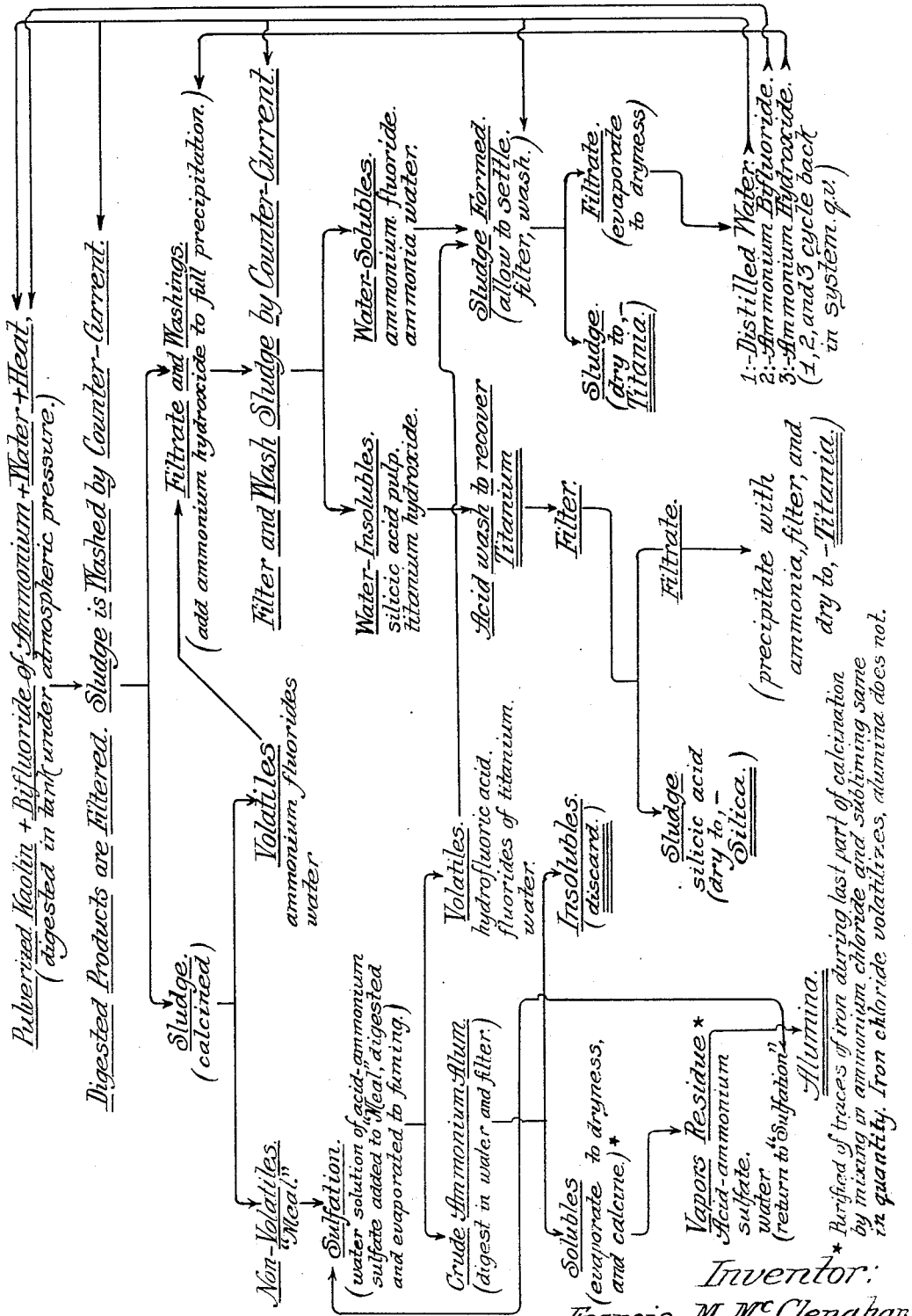

Patented July 18, 1933

1,918,923

UNITED STATES PATENT OFFICE

FRANCIS MITCHELL McCLENAHAN, OF MONMOUTH, ILLINOIS

METHOD OF RECOVERING ALUMINA FROM SILICATES

Application filed October 31, 1929. Serial No. 403,917.

This invention relates to processes for the recovery of alumina from silicates and more particularly from kaolin and kaolin-related silicates.

One of the objects of the invention is to provide a method by which the oxide of aluminum, commonly known as alumina, may be produced economically from kaolin. A further object of the invention is to provide a more economical and direct method of treatment of aluminum-ammonium double fluorides to produce aluminum oxide with economy and in commercial quantities. A further object is to provide a process by which materials used to treat the aluminum or fluoride compounds may be recovered and re-used for treating successive batches. Other objects and advantages will appear as the specification proceeds.

In my United States Patent No. 1,426,890 I have described a method of treating silicates, in which the silicates are digested in an aqueous solution of the bifluoride of ammonium, the precipitate being separated from the filtrate. In this method the filtrate was made alkaline by the addition to it of ammonium hydrate, and the resulting ammonium fluoride was separated from the insoluble silicic acid.

In my United States Patent No. 1,426,891 I have described the formation of the compound $AlF_3.3NH_4F$ as the typical aluminous product of the digestion of an aluminous silicate with the bifluoride of ammonium. The tenacity of the union of these two fluorides was pointed out, and a method was proposed for their treatment.

The accompanying drawing is a flow sheet of the process involved.

In this application, it is proposed to treat such an aluminum-ammonium double fluoride, which was described as a typical aluminous product of the digestion of an aluminous silicate with the bifluoride of ammonium, to produce the oxide of aluminum. It will be observed that the double fluoride used is uncontaminated by the fluo-silicates of other metals such as potassium and sodium. These latter would be in prominent amounts if the silicate digested with the ammonium bifluoride were feldspars; but, if the original silicate is kaolin or related mineral not containing potassium or sodium or other metals in large amount, the material may be considered more or less purely a silicate of aluminum, and all other components may be considered as impurities. The naturally occurring impurities (metallic) in kaolin are principally iron and titanium. One of the purposes of the invention is to provide methods of disposing of these two naturally occurring impurities so as to produce commercially pure oxide of aluminum.

The digestion of a silicate with the bifluoride of ammonium produces two divisions of products, namely the water-solubles, and the water-insolubles. In a copending application, Serial No. 393,122, I have dealt with the principal water-soluble. The outstanding water-insoluble of such digestion of kaolin, or kaolin-related silicates, is the double fluoride or fluorides of ammonium and aluminum, and it is this insoluble which furnishes the starting material for my process, hereinafter described.

When the water-solubles are filtered from the water-insolubles, it is difficult to free the latter completely from the former, and it is not economic to endeavor to do so completely with water washing. Nor is it economic to drive off the volatilizable materials from the non-volatilizables by use of heat, until the great bulk of the water-solubles have been separated from the water-insolubles by washing. When, however, this washing shall have been taken to the economic limit, there remains behind a sludge comprising principally aluminum fluoride associated as a double component with ammonium fluoride. Incidentally there will be more or less contamination with titanium and iron fluorides in double salt union with ammonium fluoride.

The calcining of this washed sludge drives off first the ammonium silico-fluoride; then the double fluoride of iron and ammonium is broken up, the latter going over as a vaporized material and, finally, the streaming of the volatilized ammonium fluoride transforms the ammonium titano-fluoride to titanium nitride (typical:—$Ti_3N_4$). A provisional chemical equation may be taken as the following:—

$$3(NH_4)_2TiF_6 + 3NH_4F = Ti_3N_4 + 5NH_4F + 16HF.$$

Therefore, the residue left from the calcining of the dried sludge from the bifluoride digestion of the silicate (kaolin) consists of a relatively large amount of aluminum fluoride, and relatively small quantities of iron fluoride, and titanium nitride. All of the silica, and all of the ammonia will have been driven from the system by the calcining at a temperature approximating 400° C. The vapors emanating from the calcining equipment are prevailingly $NH_4F$ with notable amounts of $(NH_4)_2SiF_6$ and $NH_4F.HF$. The color of the residue becomes buff to salmon, and the appearance of this color indicates substantially the end-point of the calcining so far as silicon and ammonium compounds are concerned in the outgoing stream of vapors.

The residue comprises chiefly $AlF_3$, and $FeF_2$ or $FeF_3$ in a small amount, and $Ti_3N_4$ in a small amount. For the purpose of simplification, I shall call this residue "meal".

The next step I propose for this material is to subject it to a progressive treatment from digestion, through drying, to calcining at approximately 400° C. with ammonium sulfate and sulfuric acid, in the proper proportions, to bring about the reactions provisionally explained by the following chemical equation:

$$2AlF_3 + (NH_4)_2SO_4 + 3H_2SO_4 + 3H_2O = 6HF + (NH_4)_2SO_4 + 3H_2SO_4 + Al_2O_3.$$

Since the aluminous composition of the "meal" by far exceeds the titanium content the HF evolved will be relatively very large with respect to the titanium nitride present. For instance the molecular ratio of aluminum to titanium may easily be as much as fifteen times the titanium. In this case, I would suggest that we might expect approximately as many as ninety molecules of HF for each atom of Ti.

By increasing the mass of the HF in the reaction on the nitride without an accompanying stream of $NH_4F$ the equation noted above, in which the nitride itself is explained, becomes reversed, and the nitride is re-transformed to the ammonium titano-fluoride. The provisional equation explanation is given at this place:

$$Ti_3N_4 + 90HF = 2(NH_4)_2TiF_6 + TiF_4 + 74HF.$$

All of these products in the right hand term of the equation are volatile under the conditions of the treatment.

Therefore, early in the reaction of the mixed sulfates on the "meal" the titanium is carried out of the system as is also the fluorine. This reaction is completed when the evolution of fluorine, derived from the aluminum fluoride, is completed. The evolution is completed when the aluminum is changed to a more or less dehydrated ammonium alum.

The next step is the raising of the mass to approximately 400° C., whereby the following reaction takes place:—

$$(NH_4)_2SO_4 + Al_2(SO_4)_3 + 3H_2O \ldots = (NH_4)_2SO_4 + Al_2O_3 + 3H_2SO_4$$

Comparing the materials in the left term of the equation with $Al_2(NH_4)_2(SO_4)_4.24H_2O$, which is commonly called ammonium alum, it will be observed that the former contains about ⅛ of the proper amount of water for true crystallized alum, and may therefore be called ammonium alum with a deficiency of water. This material is ⅞ dehydrated, and the water contained therein will have little power of oxidation of the titanium under the conditions of the system of calcining. However, the streaming of ammonium sulfate from this compound is accompanied by a hydrolizing of the aluminum sulfate to alumina and sulfuric acid. The ammonium sulfate, upon volatilization, has an endothermic effect, by which the alumina is inhibited from crystallizing. The so-called water of crystallization is in fact water of constitution and acts as a chemical re-agent upon the aluminum sulfate in the hydrolizing action described.

The volatilized ammonium and hydrogen sulfates are in the same proportion as used in the digestion of the "meal" and may be returned without loss to a new batch of "meal".

The temperatures of the evolution of the HF with its titanium content and this final production of alumina are widely separated, which allows the first volatilized products to be trapped one way and returned as bifluoride of ammonium in the digestion of a fresh batch of kaolin. The trapping of the products volatilized at a higher temperature allows them to be preserved in high efficiency and re-used as described.

The hot calcined residue may be purified and freed from contamination with iron oxide by salting it with ammonium chloride and continuing the calcining. By this method, the iron chlorides are volatilized and may be trapped along with the excess of ammonia. The resultant product is an alumina of very high purity and which is readily soluble in both alkalies and acids. By well-known methods the alumina, or oxide of aluminum, may be reduced to the metal aluminum.

While in the foregoing description I have stated particular re-agents and treating materials, it will be understood that other equivalent re-agents or materials may be used without departing from the spirit of my invention. Also, it is obvious that other steps may be substituted for the steps in the processes or methods outlined, which are well-known chemical equivalents for accomplishing the same results.

The foregoing detailed description has been given by way of example and for clearness of understanding only, and no unnecessary limitations should be understood therefrom, but the appended claims should be construed as broadly as permissible, in view of the prior art.

What I regard as new, and desire to claim by Letters Patent, is:

1. In a process for the production of alumina, comprising preparatorily digesting an aluminous silicate with a fluoride of ammonium to obtain a residue containing aluminum-ammonium fluoride, heating said residue, and treating the residue to remove impurities, said last mentioned treatment comprising digesting the residue with ammonium sulfate and heating the mass.

2. In a process for the production of alumina, the steps comprising decomposing the ammonium-aluminum fluorides derived from said silicates through heating said fluorides at a temperature sufficient to volatilize the dissociated ammonium fluoride compounds, digesting the mass with sulfuric acid, ammonium sulfate, and water and heating to remove the volatile products.

3. In a process for the production of alumina, the steps comprising decomposing the ammonium-aluminum fluorides derived from said silicates through heating said fluorides at a temperature sufficient to volatilize the dissociated ammonium fluoride compounds, digesting the mass with sulfuric acid, ammonium sulfate, water, heating to remove the volatile fluorine products of said digestion, and recovering said products.

4. In a process for the production of alumina, the steps comprising decomposing the ammonium aluminum fluorides derived from said silicates through heating said fluorides at a temperature sufficient to volatilize the dissociated ammonium fluoride compounds, digesting the mass with sulfuric acid, ammonium sulfate and water heating to remove the volatile fluorine products of said digestion, and re-using said volatile products in treating a new batch of silicates.

5. In a process for the production of alumina, the steps comprising decomposing the ammonium-aluminum fluorides derived from said silicates through heating said fluorides at a temperature sufficient to volatilize the dissociated ammonium fluoride compounds, digesting the mass with sulfuric acid, ammonium sulfate, water, and raising the temperature of the residue to a sufficient degree to decompose the sulfates.

6. In a process for the production of alumina, the steps comprising decomposing ammonium-aluminum fluorides from said silicates through the agency of heat at a temperature sufficient to volatilize the dissociated ammonium-fluoride compounds and carry the volatilized products from the presence of the non-volatile aluminum fluoride, digesting the mass with acid ammonium sulfate, and heating to remove the volatilized products.

7. In a process for the production of alumina, the steps comprising preparatorily digesting silicates with a fluoride of ammonium to obtain the ammonium-aluminum fluorides, heating the mass until the residue assumes a color which is substantially buff to salmon, digesting the residue with acid-ammonium sulfate to remove the fluorine compounds, and calcining the residual mass.

8. In a process for the production of alumina, the steps comprising preparatorily digesting silicates with a fluoride of ammonium to obtain ammonium-aluminum fluorides, heating the material until the residue assumes a color which is substantially buff to salmon, digesting the residue with acid-ammonium sulfate, heating the mass to volatilize the titanium present, and calcining the residues.

9. In a process for the production of alumina, the steps comprising preparatorily digesting an aluminum silicate with a fluoride of ammonium to obtain a residue containing aluminum-ammonium fluoride, heating the mass to obtain a non-volatile residue, digesting the residue with aluminum sulfate and sulfuric acid, evaporating the mixture to dryness, and calcining the mass to obtain a volatile acid-ammonium sulfate product and a non-volatile alumina product.

10. In a process for the production of alumina, the steps comprising preparatorily digesting an aluminous silicate with a fluoride of ammonium to obtain a residue containing aluminum-ammonium fluoride, heating the mass to obtain a non-volatile residue, digesting the residue with ammonium sulfate and sulfuric acid and heating the mass in the presence of ammonium chloride.

11. In a process for the production of alumina, the steps comprising preparatorily digesting an aluminous silicate with a fluoride of ammonium to obtain a residue containing aluminum-ammonia fluoride, digesting the residue with ammonium sulfate, sulfuric acid and water, evaporating the mixture to dryness, calcining the mass at a temperature below about 450° C. in the presence of ammonium chloride to volatilize the iron, and trapping the volatile products for re-use.

12. In a process for the production of alumina, the steps comprising preparatorily digesting an aluminous silicate with a fluoride of ammonium to obtain a residue containing aluminum-ammonium fluoride, heating the mass to obtain a non-volatile residue, digesting the mass with acid-ammonium sulfate, and calcining the residue.

13. In a process for the production of alumina, the steps comprising preparatorily digesting an aluminous silicate with a fluoride of ammonium to obtain a residue containing aluminum-ammonium fluoride, heating the mass to dryness, digesting the residue with ammonium sulfate and sulfuric acid, and calcining the mass.

14. In a process for the production of alumina, the steps comprising preparatorily digesting aluminous silicates in the presence of a fluoride of ammonium to produce a sludge containing ammonia-aluminum fluorides and other metallic fluorides, decomposing the sludge by heating at a temperature sufficiently elevated to dissociate said materials into volatile and non-volatile fractions, the residual mass having a color from buff to salmon, digesting the residue with acid-ammonium sulfate, recovering the hydrofluoric acid evolved from said digestion with acid-ammonium sulfate, filtering the non-volatile mass of ammonium-aluminum sulfate to remove undecomposed material, evaporating the filtrate to dryness, calcining the dry mass, recovering the volatile product of acid-ammonium sulfate evolved in the calcining operation, and calcining the non-volatile alumina in the presence of ammonium chloride to remove the iron.

FRANCIS MITCHELL McCLENAHAN.